US009842263B2

(12) United States Patent
Kim et al.

(10) Patent No.: US 9,842,263 B2
(45) Date of Patent: Dec. 12, 2017

(54) INTER-VEHICLE AUTHENTICATION USING VISUAL CONTEXTUAL INFORMATION

(71) Applicant: Ford Global Technologies, LLC, Dearborn, MI (US)

(72) Inventors: Yu Seung Kim, Sunnyvale, CA (US); Jun Han, East Palo Alto, CA (US); Patrick Tague, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 14/937,583

(22) Filed: Nov. 10, 2015

(65) Prior Publication Data

US 2017/0132477 A1    May 11, 2017

(51) Int. Cl.
*G06K 9/00* (2006.01)
*H04N 5/44* (2011.01)
*G06K 9/52* (2006.01)
*G06K 9/32* (2006.01)
*H04L 9/08* (2006.01)

(52) U.S. Cl.
CPC ......... *G06K 9/00791* (2013.01); *G06K 9/325* (2013.01); *G06K 9/52* (2013.01); *H04L 9/0844* (2013.01); *H04N 5/44* (2013.01)

(58) Field of Classification Search
CPC .............................. G06K 9/00791; G06K 9/52
See application file for complete search history.

(56) References Cited

U.S. PATENT DOCUMENTS

| 8,397,063 | B2 | 3/2013 | DiCrescenzo |
| 8,526,606 | B2 | 9/2013 | Muthaiah |
| 8,933,776 | B2 | 1/2015 | Dua |
| 8,995,662 | B2 | 3/2015 | Rubin |
| 9,020,657 | B2 | 4/2015 | Uhler |
| 2009/0271112 | A1 | 10/2009 | Basnayake |

(Continued)

OTHER PUBLICATIONS

Nguyen. "Asynchronous Scheme for Optical Camera Communication-Based Infrastructure to Vehicle Communication" Hindawi Publishing Corporation , 2015 . p. 11.*

*Primary Examiner* — Oneal R Mistry
(74) *Attorney, Agent, or Firm* — David R. Stevens; Stevens Law Group

(57) ABSTRACT

Authentication of vehicles in preparation for V2V communication includes vehicle A taking a picture of vehicle B ($V_A$) and vehicle B taking a picture of vehicle A ($V_B$). These pictures are then shared. Vehicle A determines the relative location of vehicle B indicated in $V_A$ and $V_B$. If they agree, then vehicle A and B authenticate one another, such as using Diffie-Hellman key exchange. Identifying vehicle A and vehicle B in the pictures may include identifying the license plates of vehicle A and vehicle B in the pictures. Vehicles A and B may exchange license plate numbers prior to taking of the pictures. Image spoofing may be prevented by taking both forward and rearward facing pictures by both vehicles. Objects in pictures facing the same direction may be identified to verify that the pictures were taken nearly simultaneously.

20 Claims, 8 Drawing Sheets

(56) References Cited

U.S. PATENT DOCUMENTS

| | | | |
|---|---|---|---|
| 2012/0213412 A1* | 8/2012 | Murashita | G06T 7/0042 |
| | | | 382/104 |
| 2014/0036076 A1* | 2/2014 | Nerayoff | H04N 7/181 |
| | | | 348/148 |
| 2015/0065166 A1 | 3/2015 | Ward | |
| 2015/0248503 A1* | 9/2015 | Glunz | G06T 17/00 |
| | | | 703/1 |
| 2015/0248836 A1* | 9/2015 | Alselimi | G06K 9/00785 |
| | | | 348/149 |
| 2016/0097648 A1* | 4/2016 | Hannah | G06K 9/00785 |
| | | | 701/118 |

* cited by examiner

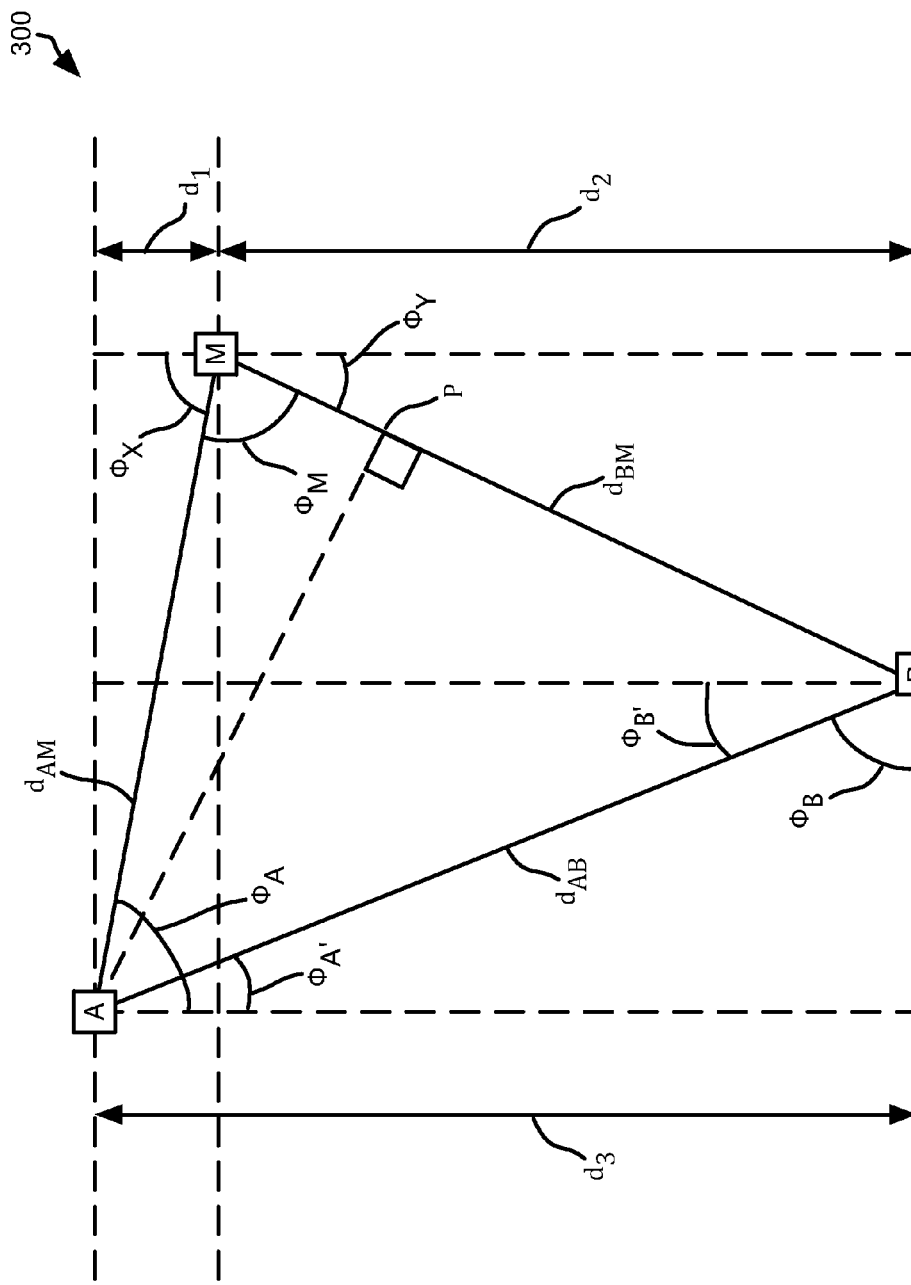

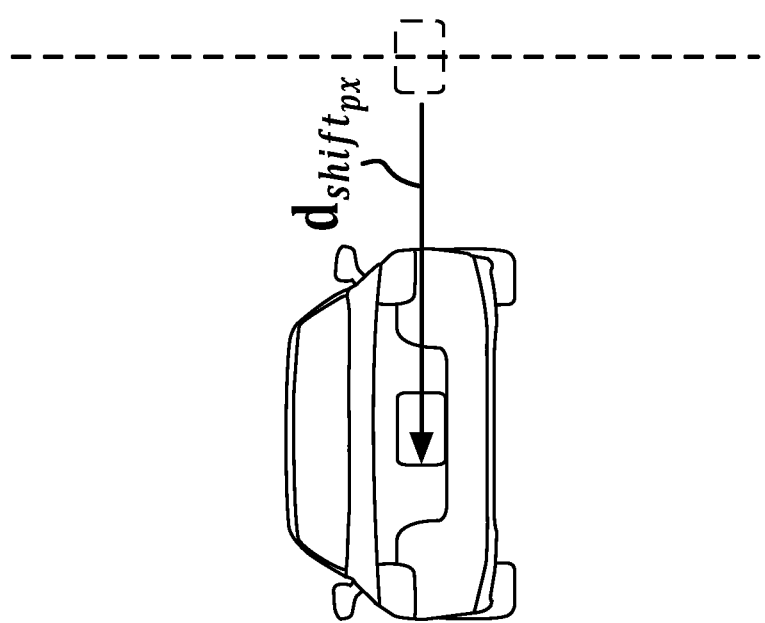

INTER-VEHICLE AUTHENTICATION USING VISUAL CONTEXTUAL INFORMATION

BACKGROUND

Field of the Invention

This invention relates to performing authenticated vehicle-to-vehicle communications.

Background of the Invention

Advances in vehicular technology are revolutionizing the vehicle industry today. Inter-vehicle communication, among many other applications, receives significant attention especially for its traffic safety enhancement features. This trend is exemplified by immense amount of research and industry attention on the use of Vehicle-to-Vehicle (V2V) communication by self-driving vehicles and platooning trucks [32, 26, 22]. Moreover, the United States Department of Transportation announced that the government will investigate passing laws to install V2V communications to all vehicles in the near future to enhance traffic safety [8].

While V2V communication is intended to increase the security and safety of vehicles, it also opens up potential threats for adversaries. The attackers can launch different types of attacks to either greedily benefit themselves or to maliciously cause damage to victims. For example, attackers may transmit bogus information to influence neighboring vehicles to divert other vehicles on the path to gain free path or forge their sensor information to circumvent liabilities for accidents [30]. Platooning vehicles are also vulnerable to collision induction attacks [15]. In addition, Sybil attacks are also possible by using multiple non-existing identities or pseudonyms [11]. Hence, securing inter-vehicular communications is of critical significance that may save users from life-threatening attacks.

In efforts to secure the V2V communications, Dedicated Short-Range Communications (DSRC) [9, 25, 23], the de facto V2V communication standard, leverages PKI to authenticate public keys of vehicles. While this solution aims to provide sufficient security guarantees, many attacks are in fact possible. One of the main problems results from location spoofing impersonation attacks. In these attacks, an inside attacker (i.e., a malicious vehicle with a correct certificate), transmits messages with forged locations. For example, an attacker creates a "ghost vehicle" by forging his location to victim vehicles [12]. Similarly, a malicious vehicle in a platoon may impersonate another vehicle's position by forging its location within the platoon [15].

The systems and method disclosed herein provide a robust approach for authenticating vehicles for V2V communication.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is a diagram illustrating distances and angles between vehicles performing authentication in accordance with an embodiment of the present invention; FIG. 7B is a diagram illustrating the location of a vehicle license plate in an image in accordance with an embodiment of the present invention.

DETAILED DESCRIPTION

Figure 1:
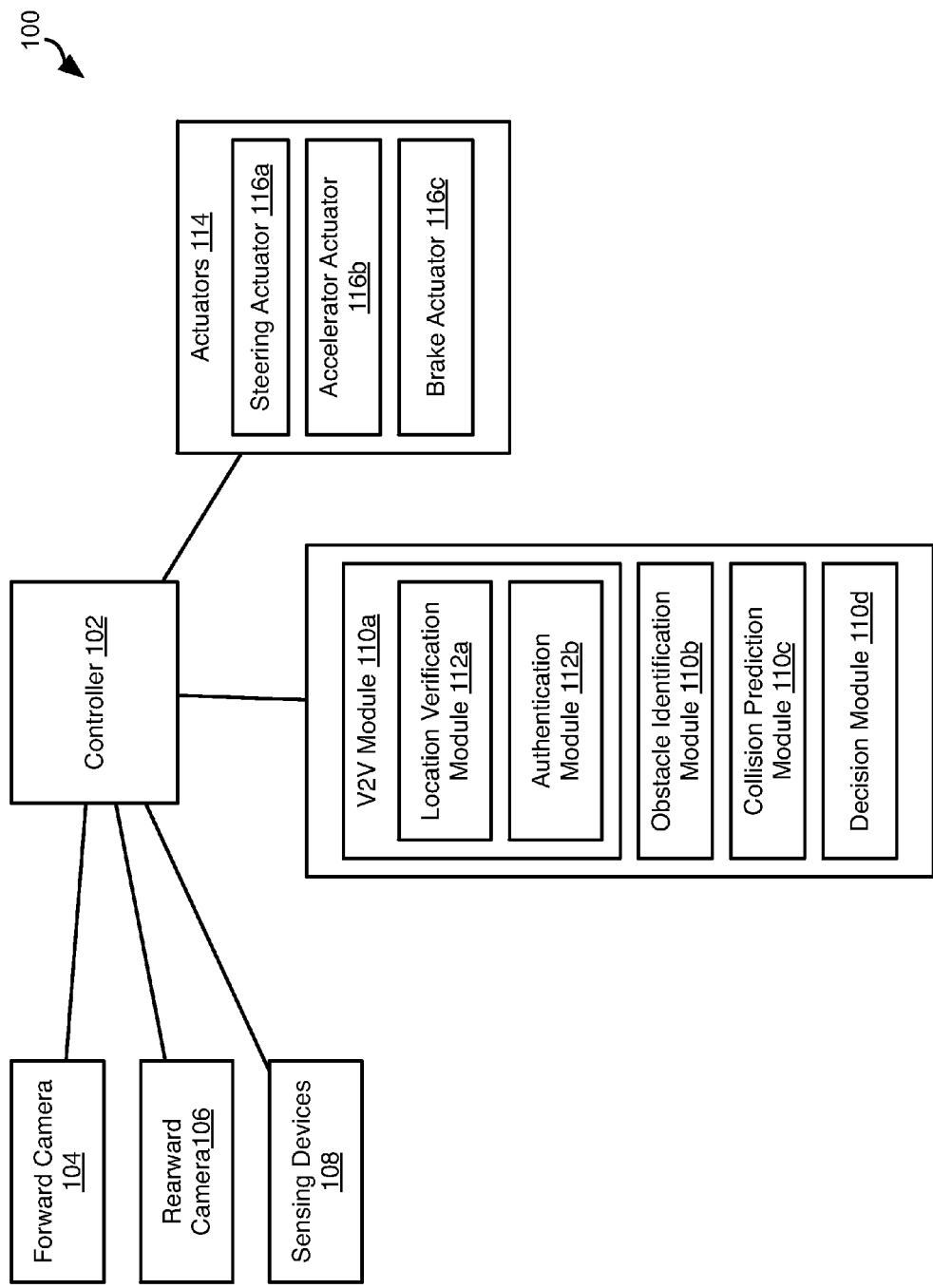
FIG. 1 is a schematic block diagram of a system for implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, the controller 102 may perform authenticated V2V communication in accordance with an embodiment of the present invention.

The controller 102 may be coupled a forward facing camera 104 and a rearward facing camera 106. The forward facing camera 104 may be mounted on a vehicle with a field of view facing forward and the rearward-facing camera 106 may be mounted to the vehicle having the field of view thereof facing in a rearward direction. The rearward-facing camera 106 may be a conventional back-up camera or a separate camera having a different field of view. The cameras 104, 106 may be used for performing authentication methods as disclosed herein and may additionally be used for performing obstacle detection.

The controller 102 may be coupled to one or more other sensing devices 108, which may include microphones or other sensors useful for detecting obstacles, such as RADAR, LIDAR, SONAR, ultrasound, and the like.

The controller 102 may execute a V2V (vehicle-to-vehicle) module 110a. The V2V module 110a includes a location verification module 112a. The location verification module 112a verifies that another vehicle seeking to communicate with the controller 102 using V2V communication is in fact a vehicle in proximity to the controller 102. In particular, the location verification module 112a verifies the location of the other vehicle by exchanging images as discussed in greater detail below.

The V2V module 110a may further include an authentication module 112b. The authentication module 112b performs key exchange, such as using the Diffie-Hellman approach, public key encryption, or some other authentication technique. The authentication module 112b may further handle performing secured communication between the controller and the other vehicle. The manner in which authentication and secured communication is performed is described in greater detail below.

The controller 102 may further execute an obstacle identification module 110b, collision prediction module 110c, and decision module 110d. The obstacle identification module 110b may analyze one or more image streams from the cameras 104, 106 or other camera and identifies potential obstacles, including people, animals, vehicles, buildings, curbs, and other objects and structures. The obstacle identification module 110b may additionally identify potential obstacles from outputs of the sensing devices 108, such as using data from a LIDAR, RADAR, ultrasound, or other sensing system.

The collision prediction module 110c predicts which obstacle images are likely to collide with the vehicle based on its current trajectory or current intended path. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

Figure 2:
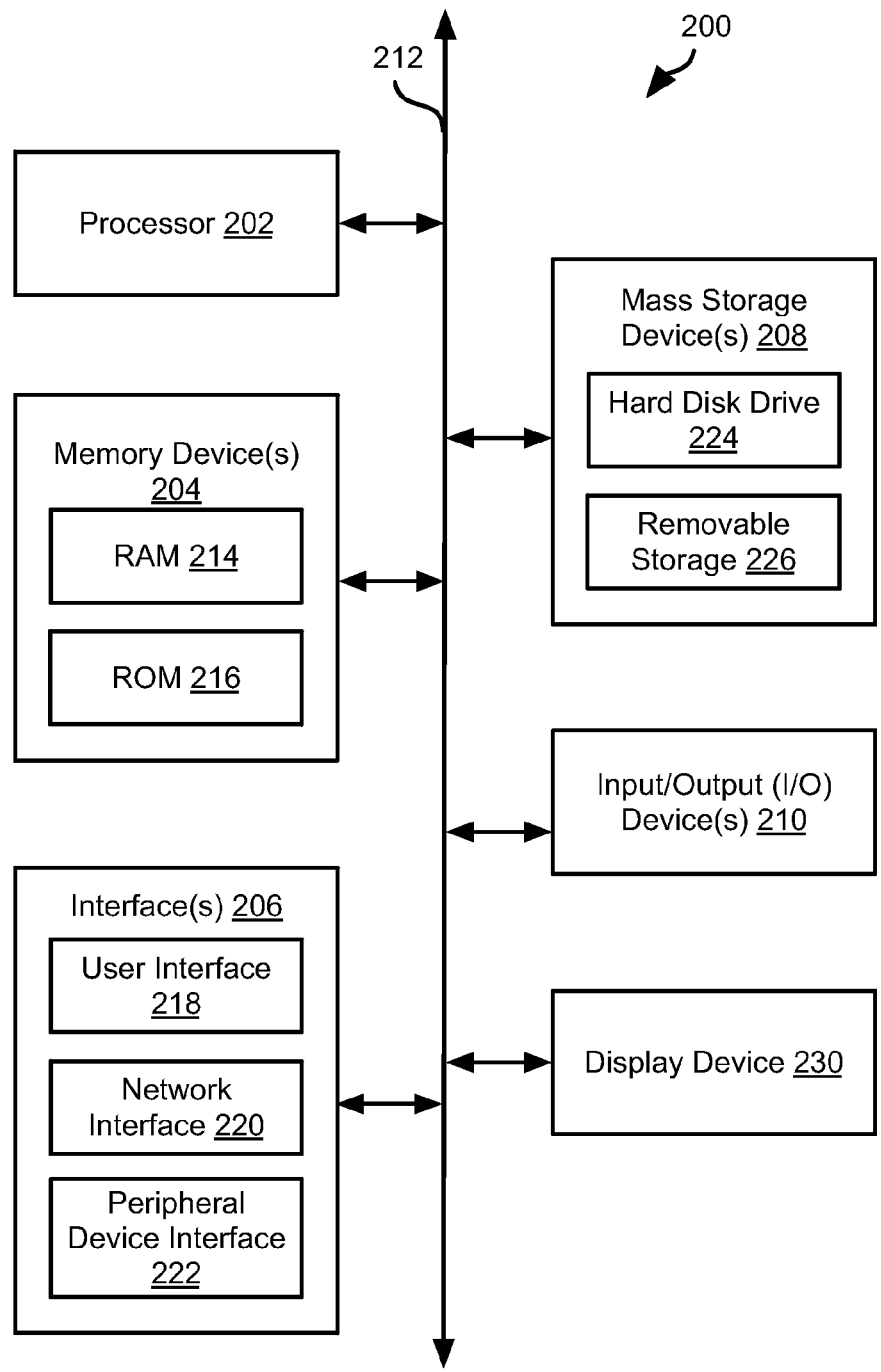
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

1. INTRODUCTION

Figure 3:
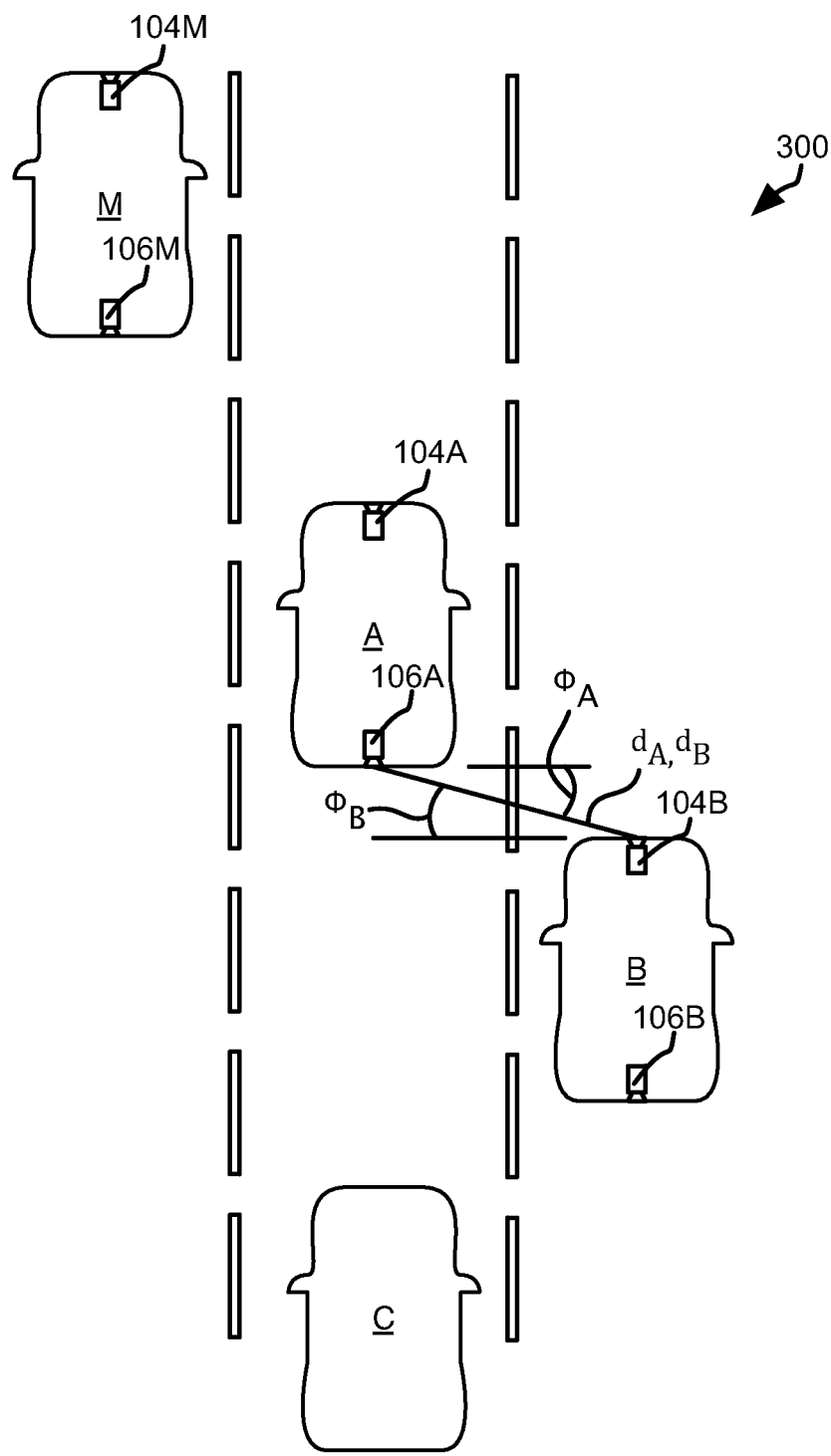
FIG. 3 is a schematic diagram illustrating relative positions of vehicles performing authentication in accordance with an embodiment of the present invention.

To solve the aforementioned problem of securing V2V communication, the systems and methods disclosed herein provide a cryptographic credential with a physical identity and co-presence component to help infer one's location. A vehicle authentication approach ("VAuth") is disclosed herein and provides for secure authenticated key agreement scheme that addresses the aforementioned concerns for V2V communications while the vehicles are driven on the road. The VAuth approach includes capturing a car's visual contextual information using a camera as a means to bind its physical identity and its co-presence to the other vehicle. Specifically, two moving vehicles on the road would have a unique pair of relative distance (d) and angle ($\Phi$) at a given point of time that no other vehicles can experience. FIG. 3 illustrates a high level idea of the use of VAuth. vehicles A and B both take a snapshot of each other simultaneously (e.g. within 1 s, preferably within 100 ms, more preferably within 10 ms) and exchange the images to prove their relative d and $\Phi$. Specifically, VAuth leverages cryptographic commitment and decommitment schemes to bind the vehicle's cryptographic key with its physical identity (license plate number) and its co-presence (d and $\Phi$), which help to infer the location.

Due to this binding, VAuth eliminates the aforementioned location spoofing impersonation attacks. Through this binding, VAuth is also robust against Man-in-the-Middle (MitM) attacks that may be present during the key agreement steps [16, 20]. In addition, VAuth may also restricts image forgery and spoofing attacks because each vehicle may the validity of received image using commonly observed objects (e.g., neighboring vehicles, road signs, terrains in the background, etc.).

VAuth enables automated key establishment among mobile vehicles even where the following constraints are present. First, there may be a requirement for decentralized trust management making traditional approach of relying on a remote and central trusted third party (TTP) questionable. TTPs incur a large management cost and are vulnerable to a single point of failure. Second, there may be no requirement for human interaction and involvement due to fast dynamics of vehicles moving in traffic. Including drivers and passengers in the loop not only degrades usability, but may significantly distract from driving tasks. Third, there may be a requirement to use available hardware in vehicles to keep vehicle costs low.

The goal of VAuth is to Goals. The main goal of VAuth is to secure against location spoofing impersonation attacks in today's V2V communications by binding the physical identity and co-presence of the pair of neighboring cars. We define "neighboring vehicles" as vehicles within each other's line of sight (i.e., camera's field of view). In doing so, we enable a pair of vehicles to establish a secure channel by performing an ad-hoc secure key agreement while the vehicles are on the road. This process is referred to as "pairing" in this application. The key agreement protocol should be robust against active attacks such as Man-in-the-Middle (MitM) [16, 20] and image spoofing attacks. VAuth augments the integrity and authenticity of key agreement messages. Integrity and authenticity guarantees that the key agreement messages come unaltered en route from the claimed sender.

To summarize, the description of VAuth included herein discloses: (a) a secure V2V key agreement protocol that binds physical identity and presence to a cryptographic key; (b) security analysis of VAuth protocol to demonstrate its robustness against MitM attacks; (c) an implementation and evaluation of VAuth conducted with real-world vehicles.

The attacker's goal is to break the integrity and authenticity of the key agreement scheme between two legitimate vehicles. This application considers both passive and active attackers. Passive attackers merely observe the wireless communication in attempts to launch attacks (e.g., eavesdropping attack). Active attackers may inject, replay, modify, and delete messages in the communication channel. In this application, an approach is disclosed that deals with attackers that are co-located with the legitimate entities, i.e., neighboring vehicles traveling along the road. In particular, attackers impersonating a legitimate entity by launching MitM attacks.

2. VAUTH

2.1 Overview

VAuth leverages visual images of the vehicles' contextual information to verify authenticity during a pairing process. Any two neighboring pair of vehicles and only those two neighboring pair of vehicles share and experience a unique relative distance (d) and angle ($\Phi$) at a specific time that no other vehicles experience (where $0 \leq \phi \leq 2\pi$ For example, vehicles A and B in FIG. 3 share a relative distance and angle. Note that it is possible for another pair of vehicles (e.g., vehicles B and C) to have their own d and $\Phi$ relative to each other, but it is impossible to have the same d and $\Phi$ relative to vehicle A.

The vehicles prove their authenticity by taking camera snapshot of each other to present d and $\Phi$ as a proof. The pair of vehicles identify each other as "target" vehicles to pair by initiating periodic beacon messages. The two vehicles exchange beacon messages that contain their identifiers (i.e., license plate number). If the identifiers are not found in each vehicle's local "paired" list, the two vehicles will identify each other as the "target" vehicle to pair.

Referring to FIG. 3 legitimate vehicles A and B may pair using VAuth in the presence of an attacker vehicle M and possibly one or more benign vehicles C. Each vehicle may have a forward facing camera 104A, 104B, 104M and a rearward facing camera 106A, 106B, 106M.

Vehicles A and B may identify each other as targets for V2V communication. Subsequently, the two vehicles will take a picture of each other and exchange the images over the DSRC wireless channel. Specifically, snapshots taken by vehicle A's rear camera 106A contains vehicle B's front image, and similarly, vehicle B's front camera 104B contains vehicle A's rear image.

If the images are taken by the intended vehicles (and not by a neighboring vehicle), then the images should share the same relative distance, d. Specifically, the distance $d_A$ between vehicles A and B as measured by vehicle A using the image including vehicle B should be equal (i.e. within some tolerance) of the distance $d_B$ measured using the image including vehicle A received from vehicle B, and vice versa. Likewise, the angle $\phi_A$ between vehicles A and B as measured by vehicle A using the image including vehicle B should be equal (i.e. within some tolerance) of the angle $\phi_B$ measured using the image including vehicle A received from vehicle B. This constraint may be expressed as $|d_A - d_B| < \epsilon_d$ and $|\phi_A - \phi_B| < \epsilon_\phi$, where $\epsilon_d$ is a distance tolerance and $\epsilon_\phi$ is an angle tolerance. Where this constraint is not met, the pairing process is terminated.

The security of VAuth depends on the uniqueness of the distance ($d_A$, $d_B$) and angle ($\phi_A$, $\phi_B$) of a pair of vehicles at a specific point of time. However, consider an attacker, vehicle M, illustrated in FIG. 3, traveling along with vehicles A and B. In order to launch a MitM attack, vehicle M estimates the relative distance ($d_M \sim d_A$) and angle ($\phi_M \sim \phi_A$) and impersonates vehicle A to vehicle B by simply spoofing an image of the victim vehicle (vehicle B) with and image from a pool of prepared images with varying distances and angle relative to vehicle B. The attacker can prepare a "dictionary" of images offline, for example, when the victim's vehicle (vehicle B) is parked on a street.

In some embodiments, VAuth prevents such attacks by leveraging the fact that both vehicles' surroundings (e.g., neighboring vehicles, road signs, background objects/views, etc.) should approximately be equal. Hence, VAuth requires Vehicles A and B to take both front ($V_{A_F}$ and $V_{B_F}$) and rear images ($V_{A_R}$ and $V_{B_R}$) as depicted. Each vehicle may therefore compare the images to check if the images contain similar surroundings. For example, $V_{A_F}$ and $V_{B_F}$ should share common features since they are pointing in the same direction and $V_{A_R}$ and $V_{B_R}$ should likewise share common features. If this check fails, the vehicles reject the pairing process.

2.2 Protocol Details

The VAuth protocol includes four phases: (1) synchronization; (2) snapshot; (3) key agreement; and (4) key confirmation phases. Each phase is discussed in detail below with respect to the algorithm of Table 1, below. The definitions of the variables of the algorithm of Table 1 is included in Table 2.

TABLE 1

VAuth Protocol.
VAuth Protocol (Phase 1) Synchronization

| | | | |
|---|---|---|---|
| 1. | $A \xrightarrow{DSRC}$ All | : | $BEACON_A = ID_A$ |
| 2. | B | : | Checks against "paired" list; Aborts if found. |
| 3. | $B \xrightarrow{DSRC} A$ | : | RQST_TO_PAIR |
| 4. | A | : | Checks against "paired" list; Aborts if found. |
| 5. | $A \xrightarrow{DSRC} B$ | : | $SYNC_{AB}$ |

(Phase 2) Snapshot

| | | | |
|---|---|---|---|
| 6. | $A \xLeftrightarrow{Cam} B$ | : | Take snapshots; |
| | A | : | Front ($V_{A_F}$) and rear ($V_{A_R}$); |
| | B | : | Front ($V_{B_F}$) and rear ($V_{B_R}$). |

(Phase 3) Key Agreement

| | | | |
|---|---|---|---|
| 7. | $A \xrightarrow{DSRC} B$ | : | $C_A = H(g^a \| ID_A \| V_{A_F} \| V_{A_R})$ |
| 8. | $B \xrightarrow{DSRC} A$ | : | $C_B = H(g^b \| ID_B \| V_{B_F} \| V_{B_R})$ |
| 9. | $A \xrightarrow{DSRC} B$ | : | $D_A = g^a \| ID_A \| V_{A_F} \| V_{A_R}$ |
| | B | : | if verifyCmmt( ) == true, accept $g^a$; Computes shared key $K = (g^a)^b$; Aborts if verification failed. |
| 10. | $B \xrightarrow{DSRC} A$ | : | $D_B = g^b \| ID_B \| V_{B_F} \| V_{B_R}$ |
| | A | : | if verifyCmmt( ) == true, accept $g^b$; Computes shared key $K' = (g^b)^a$; Aborts if verification failed. |

(Phase 4) Key confirmation (check $K' \stackrel{?}{=} K$)

| | | | |
|---|---|---|---|
| 11. | A | : | $n_A \xleftarrow{R} \{1, 0\}^\eta.$ |
| | $A \xrightarrow{DSRC} B$ | : | $n_A \| M_K(n_A)$ |
| 12. | B | : | $n_B \xleftarrow{R} \{1, 0\}^\eta.$ |
| | $B \xrightarrow{DSRC} A$ | : | $n_B \| M_K(n_A \| n_B)$ |
| 13. | A | : | $M_K(n_A \| n_B) \stackrel{?}{=} M_{K'}(n_A \| n_B);$ Aborts if confirmation fails. |
| | $A \xrightarrow{DSRC} B$ | : | $M_{K'}(n_B)$ |
| 14. | B | : | $M_{K'}(n_B) \stackrel{?}{=} M_K(n_B);$ Aborts if confirmation fails. |

TABLE 2

Notations for VAuth protocol.

| Notation | Description |
|---|---|
| $\stackrel{DSRC}{\longleftrightarrow}$ | In-band wireless Dedicated Short-Range Communication channel. |
| $\stackrel{Cam}{\Longleftrightarrow}$ | Camera snapshot of each other |
| $M_K(x)$ | MAC (e.g., HMAC) computed over the input x, using key K |
| $g^x$ | Diffie-Hellman public parameter (omit mod p for brevity) |
| $H(x)$ | Cryptographic hash (e.g., SHA-3) of input x |
| $\{0, 1\}^i$ | Random binary string with length i |
| $V_{X_F}$ | Front snapshot image taken by Vehicle X |
| $V_{X_R}$ | Rear snapshot image taken by Vehicle X |

2.2.1. Synchronization Phase

Each vehicle transmits a periodic beacon message to attempt to initiate VAuth protocol. The beacon message is simply a broadcast of its vehicle identifier (i.e., license plate number, $ID_A$, $ID_B$). Continuing with the example of FIG. 3, vehicle A broadcasts its beacon message, $BEACON_A$, and vehicle B receives this message as depicted in Table 1, below. Upon receiving $BEACON_A$, vehicle B checks against its "paired" list. If $ID_A$ is not found in the list, vehicle B sends a request to pair to vehicle A. Similarly, vehicle A also checks the license plate of vehicle B ($ID_B$) against its "paired" list (Steps 2-4 of Table 1). If not found, vehicle A transmits a synchronization message to vehicle B to initiate a synchronized snapshot phase so that both vehicles identify each other as a "target" vehicle to pair with (Step 5). Note that the protocol can be further modified so that if a vehicle receives multiple pairing requests, the vehicle can prioritize the requests using other information sent together with the requests (e.g., GPS-location information to prioritize requests based on the proximity of two vehicles).

2.2.2. Snapshot Phase

Figure 4A:
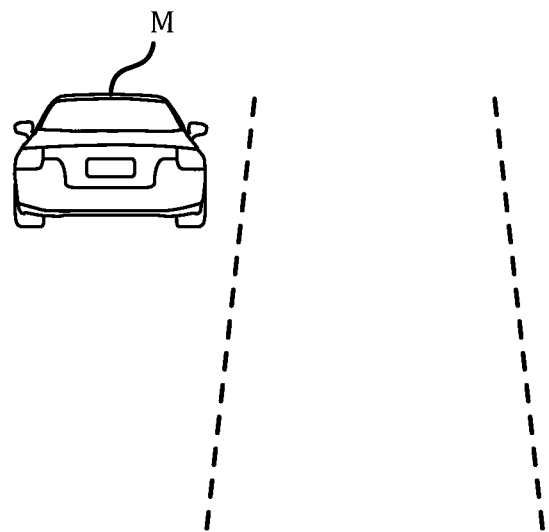
FIGS. 4A, 4B, 5A and 5B are diagrams of images that may be processed in accordance with an embodiment of the present invention.
Figure 4B:
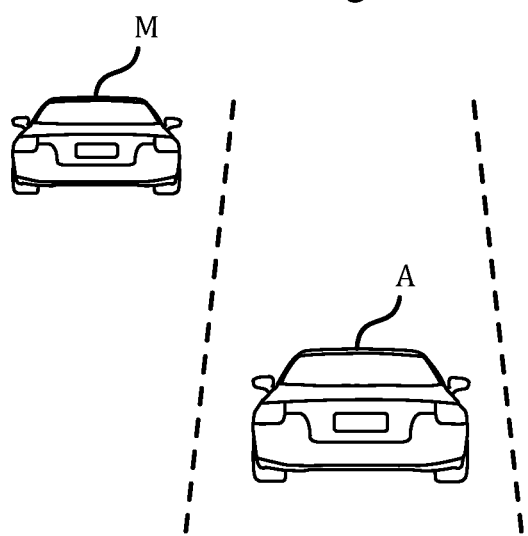
Figure 5A:
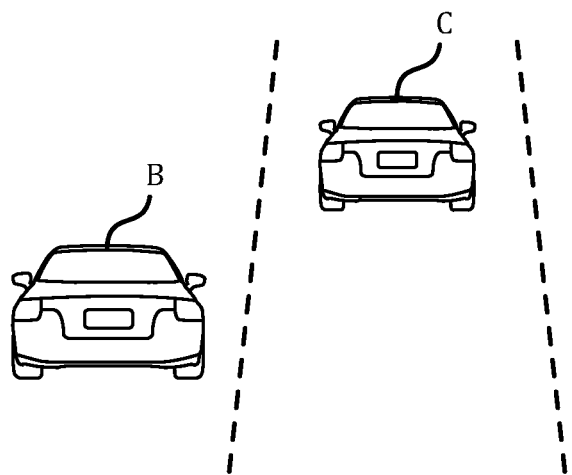
Figure 5B:
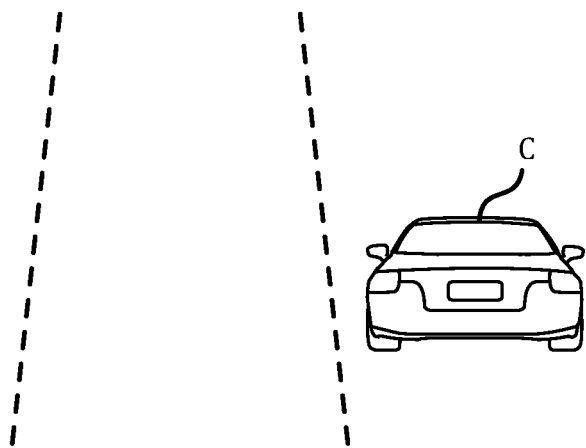

Following the synchronization phase, and in response to the messages received during the synchronization phase, both vehicle A and vehicle B simultaneously take snapshots of the front and rear views as shown in Step 6. Front and rear images taken by vehicles A and B are referenced as $V_{A_F}$ and $V_{A_R}$, and $V_{B_F}$ and $V_{B_R}$, respectively. Synchronized taking of photos may be performed by vehicles A and B coordinating a time at which photos will be taken. FIGS. 4A and 4B illustrate $V_{A_F}$ and $V_{B_F}$, respectively, for the scenario of FIG. 3. FIGS. 5A and 5B illustrate $V_{A_R}$ and $V_{B_R}$ for the scenario of FIG. 3.

2.2.3. Key Agreement Phase

In the key agreement phase, vehicles A and B first exchange their commitments ($C_A$ and $C_B$) and later reveal their decommitments ($D_A$ and $D_B$). Each vehicle leverages commitments to bind the Diffie-Hellman (DH) public parameters ($g^a$ or $g^b$) with the vehicle ID ($ID_A$ or $ID_B$), which is the license plate number, and the physical co-presence via images ($\{V_{AF}|V_{AR}\}$) or ($\{V_{BF}|V_{BR}\}$). Note that we omit mod p for brevity for all DH (Diffie-Hellman) public parameters, however mod p may still be used. Steps 7-8 depict the exchanges of commitments. Subsequently, the vehicles exchange decommitments as depicted in Steps 9-10 to disclose their committed information to each other.

Upon receiving the decommitments, each vehicle performs verification. Table 3 depicts the logic of vehicle B verifying the decommitment ($D_A$) it received from vehicle A. First, vehicle B verifies if $D_A$ is indeed the hash of $C_A$ (Lines 2-5). If true, vehicle B finds out which image (front or back) contains the target vehicle's license plate number (Lines 7-9). For example, $V_B$ should be assigned to $V_{BF}$ because the image $V_{BF}$ contains vehicle A's license plate ($ID_A$) because vehicle A is in front of vehicle B.

TABLE 3

Pseudocode of Commitment Verification
Algorithm 1 Pseudocode of commitment verification by
Car B in VAuth protocol depicted in FIG. 4 Step 9.

```
 1: procedure VERIFYCMMT(C_A, D_A, V_BF, V_BR)
 2:     ▷ Returns FALSE if D_A is not decommitment of C_A
 3:     if C_A! = H(D_A) then
 4:         return FALSE
 5:     end if
 6:
 7:     ▷ Finds which image contains the target vehicle's ID
 8:     V_B ← whichImageContainsID(V_BF, V_BR, ID_A)
 9:     V_A ← whichImageContainsID(V_AF, V_AR, ID_B)
10:
11:     ▷ Computes relative distance and angle from images
12:     D_VB ← computeDistance(V_B, ID_A)
13:     φ_VB ← computeAngle(V_B, ID_A)
14:     D_VA ← computeDistance(V_A, ID_B)
15:     φ_VA ← computeAngle(V_A, ID_B)
16:
17:     ▷ Returns FALSE if the check for D_B and φ_B fail
18:     if ((D_VA - ε_D <= D_VB <= D_VA + ε_D) &&
            (φ_VA - ε_φ <= φ_VB <= φ_VA + ε_φ)) then
19:         return FALSE
20:     end if
21:     ▷ Returns FALSE if the check for D_A and φ_A fail
22:     if ((D_VB - ε_D <= D_VA <= D_VB + ε_D) &&
            (φ_VB - ε_φ <= φ_VA <= φ_VB + ε_φ)) then
23:         return FALSE
24:     end if
25:
26:     ▷ Returns FALSE if spoofing attack suspected
27:     if (spoofingAttackDetected(V_AF, V_BF) ||
            spoofingAttackDetected(V_AR, V_BR)) then
28:         return FALSE
29:     end if
30:
31:     ▷ Successfully verified
32:     return TRUE
33: end procedure
```

Subsequently, vehicle B continues to verify the relative distance and angle of vehicles A and B (Lines 11-15). It does so by computing the distance and angle from the images, $V_B$ and $V_A$. Hence $D_{V_B}$ and $\phi_{V_B}$ are relative distance and angle of vehicle B to the position of Vehicle A's license plate ($ID_A$). Similarly, $D_{V_A}$ and $\phi_{V_A}$ corresponds to those of vehicle A to the position of vehicle B's license plate ($ID_B$). If the pair of relative distances, $\{D_{V_B}$ and $D_{V_A}\}$, and angles, $\{\phi_{V_B}$ and $\phi_{V_A}\}$, are not within an error bound, vehicle B aborts the pairing process (Lines 17-24). Potential image spoofing attacks are also detected by vehicle B (Lines 26-31). A pair of images facing the same direction (i.e., front=$\{V_{A_F}, V_{B_F}\}$ and rear=$\{V_{A_R}, V_{B_R}\}$ is input to spoofingAttackDetected( ) function to test if the snapshots are indeed taken by Vehicles A and B simultaneously. As discussed earlier, this check may involve checking the similarity of the surroundings in each image.

Once vehicle B successfully verifies the decommitment of A ($D_A$), vehicle B accepts vehicle A's DH parameter, $g^a$, and computes a shared symmetric key, $K=(g^a)^b$. Similarly, vehicle A also verifies decommitment of Vehicle B ($D_B$) and if verification succeeds, computes a shared symmetric key, $K'=(g^b)^a$.

2.2.4. Key Confirmation Phase

Upon computing the shared symmetric key, vehicles A and B perform key confirmation to verify that both cars indeed generated the same key. This is depicted in Steps 11-14. Vehicle A transmits to vehicle B a randomly generated η bit nonce, $\eta_A$ (η=256), and its Message Authentication Code (MAC) computed with the derived symmetric key, K'. (Note that in this example, HMAC-SHA-3 is used with a 256 hash bit length, but other hash functions can also be used.) Upon receiving the message, vehicle B first verifies the MAC using its derived symmetric key, K. If successful, vehicle B also transmits to vehicle A its randomly generated η bit nonce (η=256), $\eta_B$, along with a MAC computed over $\eta_A \| \eta_B$ using its symmetric key, K'. Vehicle A verifies the MAC and if successful, sends a final MAC computed over $\eta_B$ it received with the key, K', to vehicle B. Finally, VAuth protocol finishes with vehicle B's successful MAC verification. vehicles A and B now use the generated shared symmetric key as their session key.

3. SECURITY ANALYSIS

This section presents analysis of the security protocol described above. In particular, the attacker's success probability is estimated starting from a random guessing attack without any previous knowledge to a sophisticated image spoofing attack.

3.1 Random Guess Attack

A basic attack by an attacker may be performed by a hacker who is in full control of the wireless channel. The attacker tries to impersonate vehicle A to vehicle B and forges the DH public key. In Table 1, steps 7 and 9, vehicle A transmits its commitment and decommitment ($C_A$ and $D_A$) to Car B. Hence, the attacker, vehicle M, first prevents Car B from receiving $D_A$ (e.g., by jamming), and sends its own forged $D_{A'} = g^a \| ID_A \| V_{A_F} \| V_{A_R}$. However, because $C_A$ binds vehicle A's DH public key, $g^a$, together with $ID_A \| V_{A_F} \| V_{A_R}$, the attacker's probability, $P_{CarM}$, in succeeding the attack is equivalent to successfully finding a hash collision. Hence, the success probability of the attacker is bounded by the length of the hash function (256 bits SHA-3) as shown in (1), where l is hash bit length (l=256).

$$P_{CarM} = 2^{-l} \quad (1)$$

3.2 Image Spoofing Attack

Not being able to sufficiently perform a random guess attack, the attacker may try to launch more sophisticated attacks. The attacker tries to forge both the DH public key ($g^{a'}$) as well as the images ($V_{A'_F}$ or $V_{A'_R}$) to successfully impersonate vehicle A to vehicle B such that $C_A = H(g^a \| ID_A \| V_{A'_F} \| V_{A'_R})$. It is assumed that the attacker, vehicle M, first prepares a "dictionary" of images of the victim (Car B in this example) with varying distances and angles. Vehicle M, selects a prepared image, $$V_{M_{d\phi}}$$

of vehicle B with corresponding d and φ and simply transmits to vehicle B the forged commitment ($C_{A'}$) and decommitments ($D_{A'}$), which includes $$V_{M_{d\phi}}.$$

The attack may be divided into three cases for security analysis as outlined below.

In a first case Attacker has no knowledge of d and φ and VAuth does not check for image spoofing attacks. In this case, it is assumed that the attacker has no knowledge of the relative distance and angle between vehicle A vehicle B. For simpler analysis, we assume that VAuth protocol does not check for image spoofing attacks (Hence, lines 26-31 of Table 1 may be omitted in this case). In this case, vehicle M needs to randomly guess d' and φ' to select an image such that the values are within the error bounds ($\epsilon_d$ and $\epsilon_\phi$). Hence, the attacker's success probability is as shown in (2), where $d_{max}$ is the maximum distance of visible range, which depends on the capability of a camera.

$$P_{CarM} = \frac{2\epsilon_\phi}{2\pi} \cdot \frac{2\epsilon_d}{d_{max}} \quad (2)$$

In a second case, the attacker has knowledge of d and φ and the VAuth protocol does not check for image spoofing attacks. The attacker is assumed to be traveling along with vehicles A and B, and hence capable of determining an estimated distance and angle, d and φ.

FIG. 6 illustrates this scenario, where Car M attempts to find out the relative distance, $d_{AB}$, and the angle, $\phi_A$, $\phi_B$. Vehicle M knows its relative distance to vehicles A and B ($d_{AM}$ and $d_{BM}$) and the relative angles ($\phi_X$, $\phi_Y$, $\phi_M$). Using simple trigonometry, vehicle M computes the distance and angle as shown in (3) and (4) (in (3) and (4) distances specified as $d_{xy}$ are defined as the distance between points x and y). Hence, the probability of the attacker succeeding is always ($P_{CarM} = 1$).

$$d_{AB} = \sqrt{d_{AP}^2 + d_{BP}^2} \quad (3)$$
$$= \sqrt{d_{AP}^2 + (d_{BM} - d_{BM})^2}$$
$$= \sqrt{(d_{AM} \cdot \sin\phi_M)^2 + (d_{BM} - d_{AM} \cdot \cos\phi_M)^2}$$

$$\phi_A (= \phi_B) = \frac{\pi}{2} - \phi_{A'} \left( = -\frac{\pi}{2} - \phi_{B'} \right) \quad (4)$$
$$= \frac{\pi}{2} - \arccos\left( \frac{d_3}{d_{AB}} \right)$$
$$= \frac{\pi}{2} - \arccos\left( \frac{d_1 + d_2}{d_{AB}} \right)$$
$$= \frac{\pi}{2} - \arccos\left( \frac{(d_{AM} \cdot \cos\phi_x) + (d_{BM} \cdot \cos\phi_y)}{d_{AB}} \right)$$

In a third case, an attacker has knowledge of d and φ and VAuth checks for image spoofing attacks. In order to prevent the attacker from successfully launching the attack as shown in Case 2, VAuth includes verification steps for image spoofing attacks (Table 1, lines 26-31). Equation (5) depicts that the success probability of the attacker is equivalent to the success probability of succeeding in an image spoofing attack, $P_{spoofing}$.

$$P_{success} = P_{spoofing} \quad (5)$$

To detect the image spoofing attack (Attacker Type 1), VAuth leverages commonly seen objects (e.g., common neighboring cars' license plates). Car B searches for neighboring vehicles' license plates from the image pair $\{V_{A_F}, V_{B_F}\}$ and $\{V_{A_R}, V_{B_R}\}$. If the numbers are less than a predefined threshold value, protocol is aborted. Similarity of other objects and their relative location can also be used to increase the verification accuracy. For example, buildings, road signs, trees, terrain, etc. can also be used.

4. IMPLEMENTATION

An example implementation of VAuth is described in this section. In particular, this section discloses how the distance and angle to a license plate may be determined from an image as described above using the techniques described in this section.

4.1 License Plate Recognition

VAuth protocol uses license plate recognition from the images taken by vehicle cameras. In particular, VAuth may use OpenALPR [3, 4], an open-source library for automatic license plate recognition. OpenALPR takes an input image and traverses through eight phases to output recognized recognizing license plate numbers, location (corners, width, and height) and confidence level (percentage). OpenALPR implements the following phases. Phase 1 ("Detection Phase") finds "potential regions" of license plates. Subsequent phases will process all of the potential regions. Phase 2 ("Binarization Phase") creates multiple black and white images of plate regions to increase recognition accuracy. Phase 3 ("Character Analysis") finds regions or blobs of license plate number/character sizes from plate regions. Phase 4 ("Plate Edges") detects possible edges of license plates by detecting hough lines. Phase 5 ("Deskew") corrects the rotation and skew of the license plate image. Phase 6 and 7 ("Character Segmentation" and "OCR") isolates characters of the license plate and performs character recognition and confidence level. Finally, Phase 8 ("Post Processing") outputs a list of n potential candidate license plate numbers sorted with their confidence level.

4.2 Computing Distance and Angle

In order to compute the distance and angle from an output of the OpenALPR, one may use techniques for image rectification and perspective correction in computer vision [27, 24]. The algorithm leverages the ratio of real-world object in meters ("world-plane") to pixels ("image-plane") by leveraging dimensional knowledge of known objects. Similarly, a calibrated image is taken, $V_{calibration}$, which is a snapshot of the vehicle's license plate taken at a meter distance, $d_{init}$, away from the vehicle, or some other known distance. From $V_{calibration}$, the height (in pixels), $h_{init}$, of the recognized license plate box. The distance to a license plate in other images can be computed from the ratio of the height of the recognized license plate as shown in Equation 6.

$$d_{image} = d_{init} \cdot \frac{h_{init}}{h_{image}} \tag{6}$$

Note that different cars vehicles be equipped with different types of camera, resulting in $h_{init}$ values that are varying between cameras. However, each car can include their $h_{init}$ values in the commitment/decommitment messages.

Figure 7A:
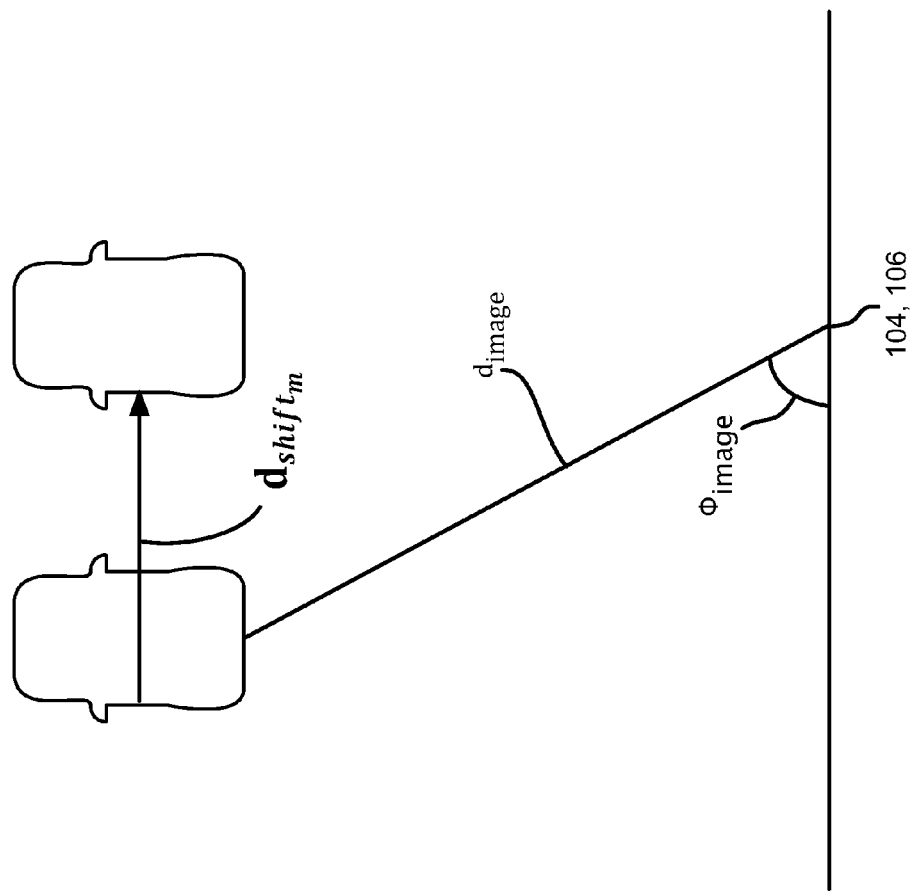
FIG. 7A is a diagram illustrating distances and angles measured from a vehicle camera in accordance with an embodiment of the present invention.

The angle may be computed using the known distances from the image. The problem of finding the relative angle is exemplified in FIGS. 7A and 7B. Specifically, the angle can be derived by using two distances, $d_{image}$ and $d_{shiftm}$ in meters as shown in (7). As illustrated in FIG. 7B, $\phi_{image}$ is the angle to the license plate compute and $d_{image}$ is the distance from the camera 104, 106 to the license plate, $d_{image}$.

$$\phi_{image} = \arccos\left(\frac{d_{image}}{d_{shift}}\right) \tag{7}$$

The value $d_{shift}$ is the "imaginary" distance in meters that the car would have shifted horizontally if the car were originally on the same line as the camera, i.e. horizontally centered in the field of view of the camera. To find $d_{shift_m}$, the ratio of the pixels to meters is obtained using an object of known dimensions in meters and pixels. For this object, we the license plate is again used. $h_m$ is the height of the actual license plate in meters, which is 0.15 meters (CA license plates have the dimension of 6"×12" (0.15 m×0.3 m)). The value $h_{px}$ is the height in pixels of the license plate from the image. From FIG. 7A, one may also find $d_{shift_{px}}$, which is the shift distance in pixels. Finally, using (8), $d_{shift_m}$ is derived.

$$d_{shift_m} = h_m \cdot \frac{d_{shift_{px}}}{h_{px}} \tag{8}$$

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

5. REFERENCES

The following references are incorporated herein by reference in their entirety:

[1] 802.11ac Technology Introduction. Rohde and Schwarz White Paper.

[2] ALPR Information Pack. NDI Information Pack Brochure.

[3] Automatic License Plate Recognition Library. https://github.com/openalpeopenalpe.

[4] OpenALPR {Automatic License Plate Recognition. http://www.openalpr.com/.

[5] Talon ANPR/ALPR Engine. TALON Brochure, 2012.

[6] Federal Register Vol. 79 No. 66 Federal Motor Vehicle Safety Standards; Rear Visibility; Final Rule. Federal Register, 2014.

[7] The new Audi Q7—Sportiness, efficiency, premium comfort. http://www.audi-mediaservices.com/publish/ms/content/en/public/pressemitteilungen/2014/12/12/the_new_audi_q7_.html, December 2014.

[8] U. S. Department of Transportation Issues Advance Notice of Proposed Rulemaking to Begin Implementation of Vehicle-to-Vehicle Communications Technology. http://www.nhtsa.gov/About+NHTSA/Press+Releases/NHTSA-issues-advanced-notice-of-proposed-rulemaking-on-V2V-communications, August 2014.

[9] Vehicle-to-Vehicle Communications: Readiness of V2V Technology for Application. DOT HS 812 014, August 2014.

[10] A. Abdelgader and W. Lenan. The physical layer of the IEEE 802.11p wave communication standard: The specifications and challenges. World Congress on Engineering and Computer Science, 2, October 2014.

[11] N. Bissmeyer, C. Stresing, and K. M. Bayarou. Intrusion detection in vanets through verification of vehicle movement data. In Vehicular Networking Conference (VNC), 2010 IEEE, pages 166-173, December 2010.

[12] Norbert Bissmeyer, Joël Njeukam, Jonathan Petit, and Kpatcha M. Bayarou. Central misbehavior evaluation for vanets based on mobility data plausibility. In *Proceedings*

[13] M. Cagalj, S. Capkun, and J.-P. Hubaux. Key agreement in peer-to-peer wireless networks. *Proceedings of the IEEE*, 94(2):467 {478, February 2006.

[14] Cisco. 802.11ac: The Fifth Generation of Wi-Fi. Cisco Technical White Paper.

[15] Bruce DeBruhl, Sean Weerakkody, Bruno Sinopoli, and Patrick Tague. Is your commute driving you crazy? a study of misbehavior in vehicular platoons. In *ACM Conference on Security and Privacy in Wireless and Mobile Networks (WiSec)*, 2015.

[16] Shlomi Dolev, ÅÅ ukasz Krzywiecki, Nisha Panwar, and Michael Segal. Certificating vehicle public key with vehicle attributes a (periodical) licensing routine, against man-in-the-middle attacks and beyond. In *Workshop on Architecting Safety in Collaborative Mobile Systems (AS-CoMS)*, 2013.

[17] Paul Eisenstein. New Toyota, Ford Systems Can Steer Clear of Pedestrians. http://www.thedetroitbureau.com/2013/10/new-toyota-ford-systems-can-steer-clear-of-pedestrians/, October 2013.

[18] Paul Eisenstein. Seven Best Cars for Front Crash Avoidance. http://www.thedetroitbureau.com/2013/09/seven-best-cars-for-front-crash-avoidance/, September 2013.

[19] H. Farid. Image forgery detection. *Signal Processing Magazine*, IEEE, 26(2):16 {25, March 2009.

[20] Keijo M J Haataja and Konstantin Hypponen. Man-in-the-middle attacks on bluetooth: a comparative analysis, a novel attack, and countermeasures. In *Communications, Control and Signal Processing, 2008. ISCCSP 2008. 3rd International Symposium on*, pages 1096-1102. IEEE, 2008.

[21] Jun Han, Yue-Hsun Lin, Adrian Perrig, and Fan Bai. Short paper: Mvsec: Secure and easy-to-use pairing of mobile devices with vehicles. In *Proceedings of the 2014 ACM Conference on Security and Privacy in Wireless and Mobile Networks, WiSec '14*, pages 51-56, New York, N.Y., USA, 2014. ACM.

[22] Jennifer Healey, Chieh-Chih Wang, Andreas Dopfer, and Chung-Che Yu. M2m gossip: Why might we want cars to talk about us? In *Proceedings of the 4th International Conference on Automotive User Interfaces and Interactive Vehicular Applications, Automotive UI '12*, pages 265-268, New York, N.Y., USA, 2012. ACM.

[23] D. Jiang, V. Taliwal, A. Meier, W. Holfelder, and R. Herrtwich. Design of 5.9 ghz dsrc-based vehicular safety communication. *Wireless Communications*, IEEE, 13(5):36-43, October 2006.

[24] Micah Johnson and Hany Farid. Metric Measurements on a Plane from a Single Image. Technical Report 2006-579, Computer Science Department, Dartmouth College, 2006.

[25] J. B. Kenney. Dedicated short-range communications (dsrc) standards in the united states. *Proceedings of the IEEE*, 99(7):1162 {1182, July 2011.

[26] Will Knight. 10-4, Good Computer: Automated System Lets Trucks Convoy as One. http://www.technologyreview.com/news/527476/10-4-good-computer-automated-system-lets-trucks-convoy-as-one/, May 2014.

[27] D. Liebowitz and A. Zisserman. Metric rectification for perspective images of planes. In *Computer Vision and Pattern Recognition, 1998. Proceedings. 1998 IEEE Computer Society Conference on*, pages 482-488, June 1998.

[28] J. M. McCune, A. Perrig, and M. K. Reiter. Seeing-is-believing: using camera phones for human-verifiable authentication. In *Security and Privacy, 2005 IEEE Symposium on*, pages 110-124, May 2005.

[29] Markus Miettinen, N. Asokan, Thien Duc Nguyen, Ahmad-Reza Sadeghi, and Majid Sobhani. Context-based zero-interaction pairing and key evolution for advanced personal devices. In *Proceedings of the 2014 ACM SIGSAC Conference on Computer and Communications Security, CCS '14*, pages 880 {891, New York, N.Y., USA, 2014. ACM.

[30] Maxim Raya and Jean-Pierre Hubaux. Securing vehicular ad hoc networks. volume 15, pages 39-68, Amsterdam, The Netherlands, The Netherlands, January 2007. IOS Press.

[31] Hien Thi Thu Truong, Xiang Gao, Babins Shrestha, Nitesh Saxena, N. Asokan, and Petteri Nurmi. Using contextual co-presence to strengthen zero-interaction authentication: Design, integration and usability. *Pervasive and Mobile Computing*, 16, Part B(0):187-204, 2015. Selected Papers from the Twelfth Annual {IEEE} International Conference on Pervasive Computing and Communications (PerCom 2014).

[32] Mitchell Waldropl. Autonomous vehicles: No drivers required. http://www.nature.com/news/autonomous-vehicles-no-drivers-required-1.16832, February 2015.

[33] Bin Zan, M. Gruteser, and Fei Hu. Key agreement algorithms for vehicular communication networks based on reciprocity and diversity theorems. *Vehicular Technology, IEEE Transactions on*, 62(8):4020-4027, October 2013.

What is claimed is:

1. A method comprising performing, by a controller of a vehicle A:
    receiving a first image from a camera of the vehicle A;
    receiving a second image from a vehicle B;
    performing at least one of (a) and (b),
        wherein (a) comprises—
            (i) determining a first estimated distance between vehicle A and vehicle B according to analysis of the first image;
            (ii) determining a second estimated distance between vehicle A and vehicle B according to analysis of the second image; and
            (iii) determining that a difference between the first estimated distance and the second estimated distance meets a threshold distance condition; and
        wherein (b) comprises—
            (iv) determining a first estimated angle between vehicle A and vehicle B according to analysis of the first image;
            (v) determining a second estimated angle between vehicle A and vehicle B according to analysis of the second image; and
            (vi) determining that a difference between the first estimated angle and the second estimated angle meets a threshold angle condition; and
    in response to at least one of (iii) and (vi), authenticating vehicle B.

2. The method of claim 1, wherein determining the first estimated distance comprises:
    identifying, by the controller of the vehicle A, an image of the vehicle B in the first image;

determining the first estimated distance according to a size and location of the image of the vehicle B in the first image;
wherein determining the first estimated angle comprises:
identifying, by the controller of the vehicle A, the image of the vehicle B in the first image;
determining the first estimated angle according to the size and location of the image of the vehicle B in the first image.

3. The method of claim 2,
wherein performing at least one of (a) and (b) comprises determining both of (a) and (b); and
wherein authenticating vehicle B in response to at least one of (iii) and (vi) comprises authenticating vehicle B in response to both of (iii) and (vi).

4. The method of claim 2, wherein:
receiving the first image from the camera of the vehicle A comprises receiving a first forward image from a forward facing camera mounted to the vehicle A and receiving a first rearward image from a rearward facing camera mounted to the vehicle A; and
receiving the second image from the vehicle B comprises receiving a second forward image from a forward facing camera mounted to the vehicle B and receiving a second rearward image from a rearward facing camera mounted to the vehicle B.

5. The method of claim 2, wherein:
identifying the image of the vehicle B in the first image comprises identifying a license plate number of the vehicle B in the first image;
wherein identifying the image of the vehicle A in the second image comprises identifying a license plate number of the vehicle A in the second image.

6. The method of claim 5, further comprising receiving, by the controller of the vehicle A from the vehicle B, a message including the license plate number of the vehicle B.

7. The method of claim 3, wherein:
determining the first estimated distance comprises—
determining a first dimension ($h_{image1}$) of a license plate of the vehicle B in the first image in pixels; and
determining the first estimated distance ($d_1$) as equal to $d_{init}*h_{init}/h_{image1}$, where $d_{init}$ is a calibration distance and $h_{init}$ is a test dimension in pixels of a test license plate positioned at $d_{init}$ from a test camera; and
determining the second estimated distance comprises—
determining a second dimension ($h_{image2}$) of a license plate of the vehicle A in the second image in pixels; and
determining the second estimated distance ($d_2$) as equal to $d_{init}*h_{init}/h_{image2}$.

8. The method of claim 7, wherein:
determining the first estimated angle comprises—
determining a first pixel offset ($d_{shift1}$) of the license plate of the vehicle B in the first image from a center of the first image in pixels;
determine a first distance offset ($d_{shift1m}$) as equal to ($h_m*d_{shift1}/h_{image1}$), where $h_m$ is a measured dimension of a test license plate;
and
determining the first estimated angle as equal to Arccos ($d_1/d_{shift1m}$); and
determining the second estimated angle comprises—
determining a second pixel offset ($d_{shift2}$) of the license plate of the vehicle A in the second image from a center of the second image in pixels;
determine a second distance offset ($d_{shift2m}$) as equal to ($h_m*d_{shift2}/h_{image2}$);
determining the second estimated angle as equal to Arccos($d_2/d_{shift2m}$).

9. The method of claim 1, wherein the camera of the vehicle A is a first camera, the method further comprising authenticating the vehicle B in response to determining that one or more background objects in the second image correspond to objects in an image received from a second camera mounted to the vehicle A and facing in an opposite direction to the first camera.

10. The method of claim 1, wherein authenticating the vehicle B comprises performing Diffie-Hellman key exchange between the vehicle A and the vehicle B.

11. A system comprising:
a vehicle;
a camera mounted to the vehicle;
a controller mounted to the vehicle, the controller programmed to:
receive a first image from the camera;
receive a second image from a vehicle B;
identify an image of the vehicle B in the first image;
identify an image of the vehicle A in the second image;
determine at least one of a first estimated distance to the vehicle B from the vehicle A and a first estimated angle to the vehicle B from the vehicle A according to a location of the image of the vehicle B in the first image;
determine at least one of a second estimated distance to the vehicle A from the vehicle B and a second estimated angle to the vehicle A from the vehicle B according to a location of the image of the vehicle A in the second image; and
if at least one of (a) and (b) is true, authenticate vehicle B and perform secured communication with vehicle B, wherein (a) is a difference between the second estimated distance and the first estimated distance being within a distance tolerance and wherein (b) is a difference between the first estimated angle and the second estimated angle being within an angle tolerance.

12. The system of claim 11, wherein the controller is programmed to authenticate vehicle B and perform secured communication with vehicle B only if both of (a) and (b) are true.

13. The system of claim 11, wherein the controller is further programmed to:
receive a first image from the camera of the vehicle A by receiving a first forward image from a forward facing camera mounted to the vehicle A and receiving a first rearward image from a rearward facing camera mounted to the vehicle A; and
receive a second image from the vehicle B by receiving a second forward image from a forward facing camera mounted to the vehicle B and receiving a second rearward image from a rearward facing camera mounted to the vehicle B.

14. The system of claim 11, wherein the controller is further programmed to:
identify the image of the vehicle B in the first image by identifying a license plate number of the vehicle B in the first image;
identify the image of the vehicle A in the second image by identifying a license plate number of the vehicle A in the second image.

15. The system of claim 14, wherein the controller is further programmed to: receive a message including the license plate number of the vehicle B.

16. The system of claim 15, wherein the controller is further programmed to:
   determine the at least one of the first estimated distance to the vehicle B from the vehicle A and the first estimated angle to the vehicle B from the vehicle A according to the location of the image of the vehicle B in the first image by—
      determining a first dimension ($h_{image1}$) of a license plate of the vehicle B in the first image in pixels; and
      determining the first estimated distance ($d_1$) as equal to $d_{init}*h_{init}/h_{image1}$, where $d_{init}$ is a calibration distance and $h_{init}$ is a test dimension in pixels of a test license plate positioned at $d_{init}$ from a test camera;
   determine the at least one of the second estimated distance to the vehicle A from the vehicle B and the second estimated angle to the vehicle A from the vehicle B according to the location of the image of the vehicle A in the second image by—
      determining a second dimension ($h_{image2}$) of a license plate of the vehicle A in the second image in pixels; and
      determining the second estimated distance ($d_2$) as equal to $d_{init}*h_{init}/h_{image2}$.

17. The system of claim 16, wherein the controller is further programmed to:
   determine the at least one of the first estimated distance to the vehicle B from the vehicle A and the first estimated angle to the vehicle B from the vehicle A according to the location of the image of the vehicle B in the first image by—
      determining a first pixel offset ($d_{shift1}$) of the license plate of the vehicle B in the first image from a center of the first image in pixels;
      determine a first distance offset ($d_{shift1m}$) as equal to ($h_m*d_{shift1}/h_{image1}$), where $h_m$ is a measured dimension of a test license plate;
      and
      determining the first estimated angle as equal to Arccos($d_1/d_{shift1m}$); and
   determine the at least one of the second estimated distance to the vehicle A from the vehicle B and the second estimated angle to the vehicle A from the vehicle B according to the location of the image of the vehicle A in the second image by—
      determining a second pixel offset ($d_{shift2}$) of the license plate of the vehicle A in the second image from a center of the second image in pixels;
      determine a second distance offset ($d_{shift2m}$) as equal to ($h_m*d_{shift2}/h_{image2}$);
      determining the second estimated angle as equal to Arccos($d_2/d_{shift2m}$).

18. The system of claim 11, wherein the camera of the vehicle A is a first camera;
   wherein the controller is further programmed to authenticate the vehicle B only if one or more background objects in the second image correspond to objects in an image received from a second camera mounted to the vehicle A and facing in an opposite direction to the first camera.

19. The method of claim 11, wherein authenticating the vehicle B comprises performing Diffie-Hellman key exchange between the vehicle A and the vehicle B.

20. The method of claim 1, wherein authenticating the vehicle B comprises performing Diffie-Hellman key exchange between the vehicle A and the vehicle B according to the algorithm of Table 1.

* * * * *